United States Patent
Dewes et al.

(10) Patent No.: US 7,785,002 B2
(45) Date of Patent: Aug. 31, 2010

(54) P-N JUNCTION BASED THERMAL DETECTOR

(75) Inventors: Brian E. Dewes, Noblesville, IN (US); Pedro E. Castillo-Borelly, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 797 days.

(21) Appl. No.: 11/633,976

(22) Filed: Dec. 5, 2006

(65) Prior Publication Data

US 2008/0130710 A1 Jun. 5, 2008

(51) Int. Cl.
G01K 7/02 (2006.01)
G01J 5/12 (2006.01)

(52) U.S. Cl. ............ 374/179; 374/121; 374/137; 136/200

(58) Field of Classification Search .......... 374/120, 374/121, 179, 141, 137, 100, 112, 170, 163, 374/183, 208; 250/338.1; 136/200
See application file for complete search history.

(56) References Cited

U.S. PATENT DOCUMENTS

| | | | | | |
|---|---|---|---|---|---|
| 2,530,256 | A | * | 11/1950 | Malek ................. | 136/225 |
| 4,516,027 | A | * | 5/1985 | Schimmelpfennig et al. ..... | 250/338.3 |
| 5,100,479 | A | * | 3/1992 | Wise et al. ........... | 136/225 |
| 5,348,903 | A | * | 9/1994 | Pfiester et al. ........ | 438/152 |
| 5,589,689 | A | * | 12/1996 | Koskinen ............. | 250/339.01 |
| 6,126,311 | A | * | 10/2000 | Schuh ................ | 374/21 |
| 6,163,061 | A | * | 12/2000 | Iida ................... | 257/467 |
| 6,222,111 | B1 | * | 4/2001 | Kern ................. | 136/201 |
| 6,305,840 | B1 | * | 10/2001 | Kim et al. ............ | 374/133 |
| 6,703,554 | B2 | * | 3/2004 | Morita et al. ......... | 136/225 |
| 6,793,389 | B2 | * | 9/2004 | Chavan et al. ........ | 374/179 |
| 7,208,736 | B2 | * | 4/2007 | Watanabe ............ | 250/338.1 |
| 2002/0066477 | A1 | * | 6/2002 | Kubo ................ | 136/227 |
| 2002/0069909 | A1 | * | 6/2002 | Kubo ................ | 136/224 |
| 2003/0205670 | A1 | * | 11/2003 | Shibayama ........... | 250/338.4 |
| 2003/0222218 | A1 | * | 12/2003 | Nozu ................ | 250/338.1 |
| 2004/0040592 | A1 | * | 3/2004 | Schneider ............ | 136/224 |
| 2004/0079885 | A1 | * | 4/2004 | Hamamoto et al. ..... | 250/338.1 |
| 2004/0164366 | A1 | * | 8/2004 | Lane et al. ........... | 257/414 |

(Continued)

FOREIGN PATENT DOCUMENTS

JP 63233339 A * 9/1988

(Continued)

*Primary Examiner*—Gail Verbitsky
(74) *Attorney, Agent, or Firm*—Jimmy L. Funke

(57) ABSTRACT

A thermopile-based thermal detector is provided by a thermocouple, formed from a single sheet of material, which is made dissimilar with a P-doped and an N-doped junction electrically isolated via a naturally forming depletion region. The thermopile P-N sheet is uniform and planar, addressing stress and manufacturing issues. The usual non-active area of a conventional thermopile is significantly reduced or eliminated, and thus the output signal per unit diaphragm area of the detector is substantially increased, without the typical reduction in the signal-to-noise ratio. Also, a significant reduction in size of the thermal detector area is provided without a reduction in signal or signal-to-noise ratio. In an aspect, a second layer of thermocouples is axially positioned over, and connected with, a first layer of thermocouples. Additional axially stacked thermopiles can be provided within the same fabrication process. Signal processing circuitry may be electrically interconnected with the thermocouple.

23 Claims, 10 Drawing Sheets

U.S. PATENT DOCUMENTS

| | | | |
|---|---|---|---|
| 2005/0017175 A1* | 1/2005 | Lee et al. | 250/338.1 |
| 2006/0000502 A1* | 1/2006 | Fiorini et al. | 136/224 |
| 2006/0038129 A1* | 2/2006 | Watanabe | 250/338.1 |
| 2006/0169902 A1* | 8/2006 | Watanabe | 250/338.1 |
| 2007/0034799 A1* | 2/2007 | Watanabe | 250/338.1 |
| 2007/0095380 A1* | 5/2007 | Dewes et al. | 136/224 |
| 2007/0227575 A1* | 10/2007 | Kato et al. | 136/224 |
| 2008/0044939 A1* | 2/2008 | Nassiopoulou et al. | 438/54 |
| 2009/0168836 A1* | 7/2009 | Hoefer et al. | 374/121 |

FOREIGN PATENT DOCUMENTS

| | | | |
|---|---|---|---|
| JP | 02205729 A | * | 8/1990 |

* cited by examiner

Comparison of Estimated Signal Generated for 1000μm Diameter Membrane

| | Configuration | Materials | Signal (μV/C) | SNR | % Signal Increase | Corresponding Figure |
|---|---|---|---|---|---|---|
| 1 | Typical Configuration | P+ Poly 2/Metal 1 | 46 | 7.5 | 0% | 1 |
| 2 | Typical Configuration | N+ Poly 1/P+ Poly 2 | 78 | 12.7 | 170% | 2 |
| 3 | Single Sheet Planar Configuration | P+ Poly 1/N+ Poly 1 | 99 | 12.1 | 215% | 5 |
| 4 | Dual Sheet Planar Configuration | P+ Poly 1/N+ Poly 1/P+ Poly 2/N+ Poly 2 | 283 | 24.6 | 615% | 8 |

Industry Benchmark Device

FIG. 10

Comparison of Diaphragm Area Required to Achieve Benchmark Operation

| | Configuration | Materials | Signal (μV/C) | Diameter (μm) | Area (sq. μm) | % Area Reduction |
|---|---|---|---|---|---|---|
| 1 | Typical Configuration | P+ Poly 2/Metal 1 | 46 | 1000 | 785,000 | 0% |
| 3 | Single Sheet Planar Configuration | P+ Poly 1/N+ Poly 1 | 46 | 900 | 635,850 | 19% |
| 4 | Dual Sheet Planar Configuration | P+ Poly 1/N+ Poly 1/P+ Poly 2/N+ Poly 2 | 46 | 544 | 232,310 | 63% |

Industry Benchmark Device

FIG. 11

P-N JUNCTION BASED THERMAL DETECTOR

FIELD OF THE INVENTION

The invention relates generally to a thermopile-based thermal detector, and more particularly to a thermocouple having a P-N junction formed from a single sheet of material.

BACKGROUND OF THE INVENTION

Thermopiles are customarily implemented in commercial applications and utilized for thermal detectors such as infrared (IR) detecting sensors. IR sensors that include thermopiles, comprised of sets of thermocouples, are used in a wide range of applications, such as automotive climate control systems and seat occupancy detection systems. An integrated thermopile-based IR sensor that combines circuitry for processing and compensating output signals of the sensor on an integrated circuit (IC) chip is described in U.S. Pat. No. 6,828,172, titled "Process for a Monolithically-Integrated Micromachined Sensor and Circuit," to Chavan et al. and U.S. Pat. No. 6,793,389, titled "Monolithically-Integrated Infrared Sensor," to Chavan et al., each of which are hereby incorporated herein by reference in their entirety. As described, integration of IR sensing and signal processing on the same IC chip leads to various advantages, which include miniaturization, the ability to process very small signals, reduction in cost, simplification of manufacturing and reduced system complexity. Further performance and manufacturing optimization through the creation of a circular membrane and thermopile is described in U.S. patent application Ser. No. 11/263,105, titled, "Infrared Detecting Device with a Circular Membrane."

IR detecting sensors frequently use thermopiles having sets of thermocouples. One end of each set of the thermocouple is situated on a membrane or diaphragm that collects IR energy (a thermally isolated region), and a different end is situated on a supporting substrate (a thermally sunk region). The formation of a thermopile uses a series of electrically connected thermocouples, each made up of dissimilar conducting or semi-conducting materials with different Seebeck coefficients, whereby thermal energy is converted into an electric voltage. This is conventionally achieved through the use of a pair of materials such as two dissimilar metals, including n-type poly-silicon and metal, p-type poly-silicon and metal, or n-type poly-silicon and p-type poly-silicon. The connections are made such that they alternate between the thermally isolated and thermally sunk regions of the device. The dissimilar materials are typically arranged either in a horizontal or vertical stack and separated (i.e., electrically isolated) by a dielectric material. This is customarily achieved by separate material depositions, photolithographic operations, and etching for each material.

FIG. 1 and FIG. 2 are plan views of a conventional vertical thermocouple arrangement. In FIG. 1, the IR detecting device 100 utilizes a first material 104 and a second material 106, which are dissimilar materials. These may be, for example, p-type poly-silicon and metal. The second material 106 is formed on top of, and electrically isolated from, the first material 104. In FIG. 2, the IR detecting device 200 utilizes a first material 204 and a second material 206, which are dissimilar materials. These may be, for example, n-type poly-silicon and metal. The second material 206 is formed along the side of the first material 204, separated by a dielectric material. With respect to the formation of the conventional IR detecting devices 100 and 200, both the physical separation by the dielectric material and the separate process steps required for the formation of each leg of the thermocouple create a considerable non-active area which consumes valuable diaphragm area, and thus reduces output signal per unit diaphragm area.

SUMMARY OF THE INVENTION

A thermopile-based thermal detector is provided by a thermocouple having dissimilar materials with a P-N junction formed from a single sheet of material. The thermopile can be situated upon a diaphragm for receiving thermal radiation, for use as an integrated and a non-integrated thermoelectric infrared (IR) sensor and detector. Signal processing circuitry can be electrically interconnected with the thermopile.

The thermopile P-N sheet is uniform and planar, thus addressing stress and mechanical manufacturing problems. The usual non-active area of a conventional thermopile is significantly reduced or eliminated, and thus the output signal per unit diaphragm area of the detector is substantially increased, without the typical reduction in the signal-to-noise ratio incurred by conventional designs. Also, a significant reduction in size of the thermal detector area is provided without a reduction in signal or signal-to-noise ratio. The present invention further provides an axial stack of thermopiles within the same fabrication process. A reduction in the cost and complexity of the fabrication of the thermocouple and thermopile is additionally provided.

Features of the invention are achieved in part by forming a thermocouple from a single sheet of material having dissimilar electrically-conductive materials, with a P-doped and N-doped junction electrically isolated via a depletion region. The thermocouple extends from a substrate to a diaphragm, the substrate defining a cavity. The diaphragm includes a first portion positioned over the cavity for receiving thermal energy and a second portion at a perimeter of the diaphragm supported by the substrate. The thermocouple includes a hot junction located on the first portion of the diaphragm and a cold junction located on the second portion of the diaphragm, forming a thermopile.

In an embodiment, a second layer of thermocouples is axially positioned over a first layer of thermocouples, an electrically insulating material such as poly-oxide is positioned between the first layer and the second layer, and the first layer is electrically connected to the second layer. The diaphragm can include an oxide situated adjacent to a nitride material, utilized for an absorbing layer and a stress compensating layer. A passivation layer, an absorptive material and a stress compensating material can be situated over the thermocouple material pair.

In an embodiment, the diaphragm is created by forming an oxide etch stop on the substrate by either a thermal process or vapor deposition, and then depositing a nitride material adjacent to the oxide etch stop. In an embodiment, the thermocouple material pair and thus the thermopile is created by depositing poly-silicon as a single sheet by chemical vapor deposition, implanting a P-type dopant, depositing a sacrificial silicon dioxide on the P-type doped polysilicon, photolithographically forming a proposed P-type dissimilar area and a proposed N-type dissimilar area, removing the sacrificial silicon dioxide by etching, and thermally depositing an N-type dopant on the proposed N-type dissimilar area. The diaphragm can be shaped in either a circular or rectangle form, and the thermocouple is wedge-shaped and narrower at the hot junction as compared to the cold junction.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 10 illustrates example signal performances of the present invention as in FIG. 5 and FIG. 8 as compared with conventionally IR sensors, in accordance with an embodiment of the present invention; and FIG. 11 illustrates example required diaphragm area of the present invention as in FIG. 5 and FIG. 8 as compared with conventionally IR sensors, in accordance with an embodiment of the present invention.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention. Further, unless indicated to the contrary, the numerical values set forth in the following specification, figures and claims are approximations that may vary depending upon the desired characteristics sought to be obtained by the present invention.

As used herein, the term "semiconductor device" is an electronic component with electronic properties of a semiconductor material such as silicon, germanium and gallium arsenide. As used herein, the term "doping type" refers to the resulting charge conduction property of a semiconductor when certain type of atoms are added to the semiconductor in order to increase the number of free positive or negative charge carriers. When the resulting semiconductor contains excessive positive charge carriers or holes, the doping type is defined as P-type. When the resulting semiconductor contains excessive negative charge carriers or electrons, the doping type is defined as N-type. Additionally, the symbols P+ and N+ are used to indicate higher concentrations of P-type and N-type doping, respectively.

Figure 1:
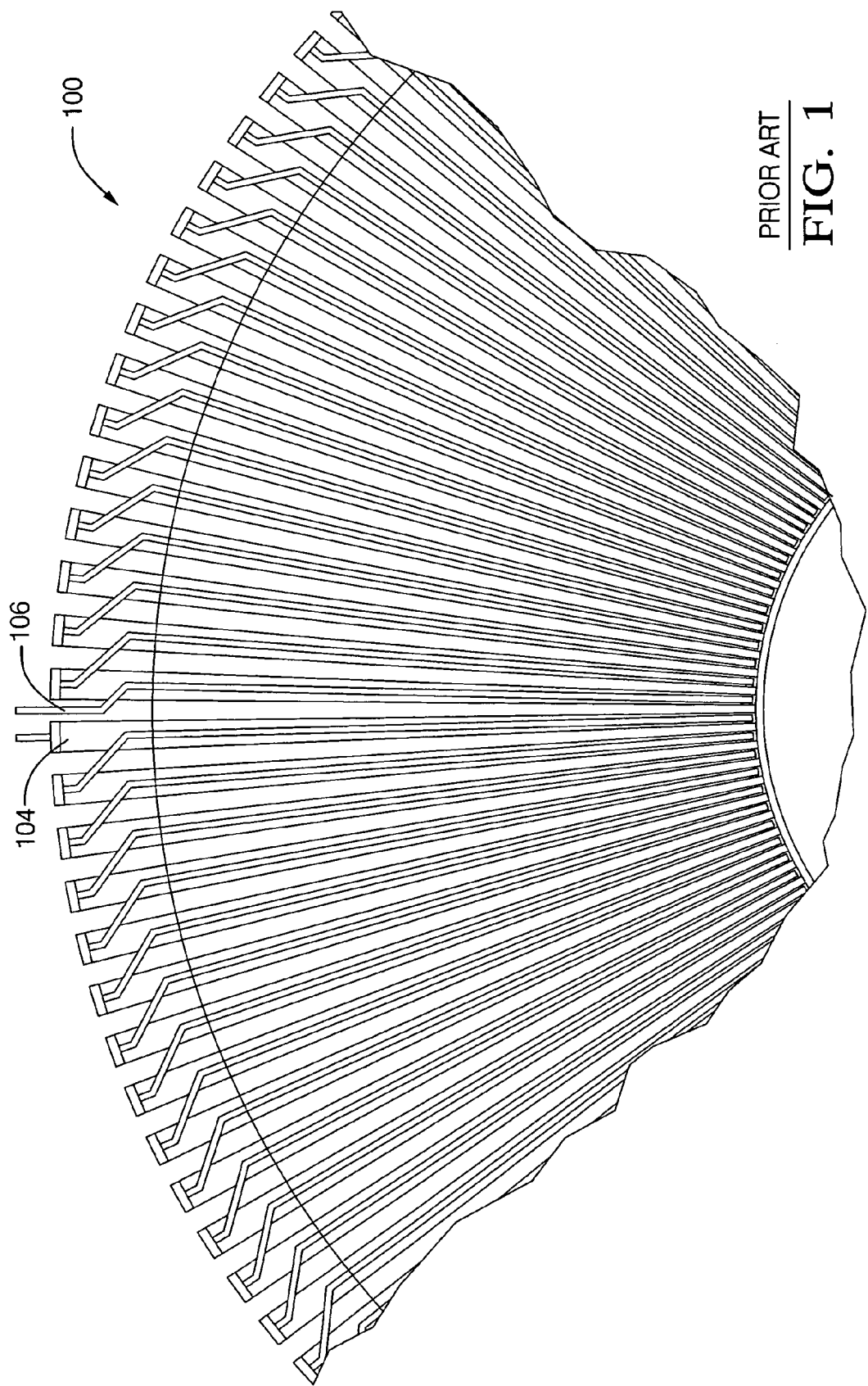
FIG. 1 is a plan view of a conventional vertical thermocouple arrangement, in which the present invention can be useful.
Figure 2:
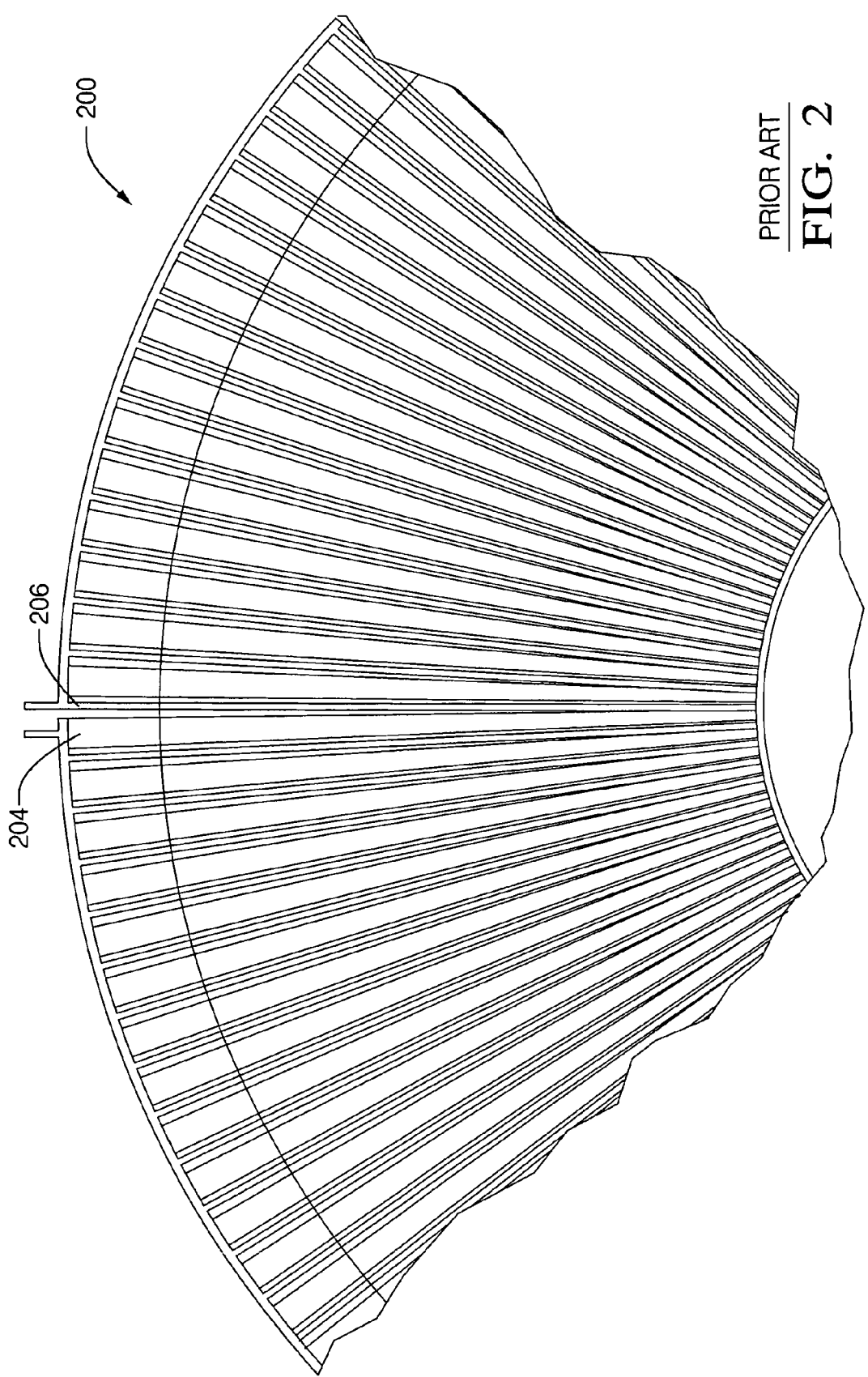
FIG. 2 is a plan view of another conventional horizontal thermocouple arrangement, in which the present invention can be useful.
Figure 3:
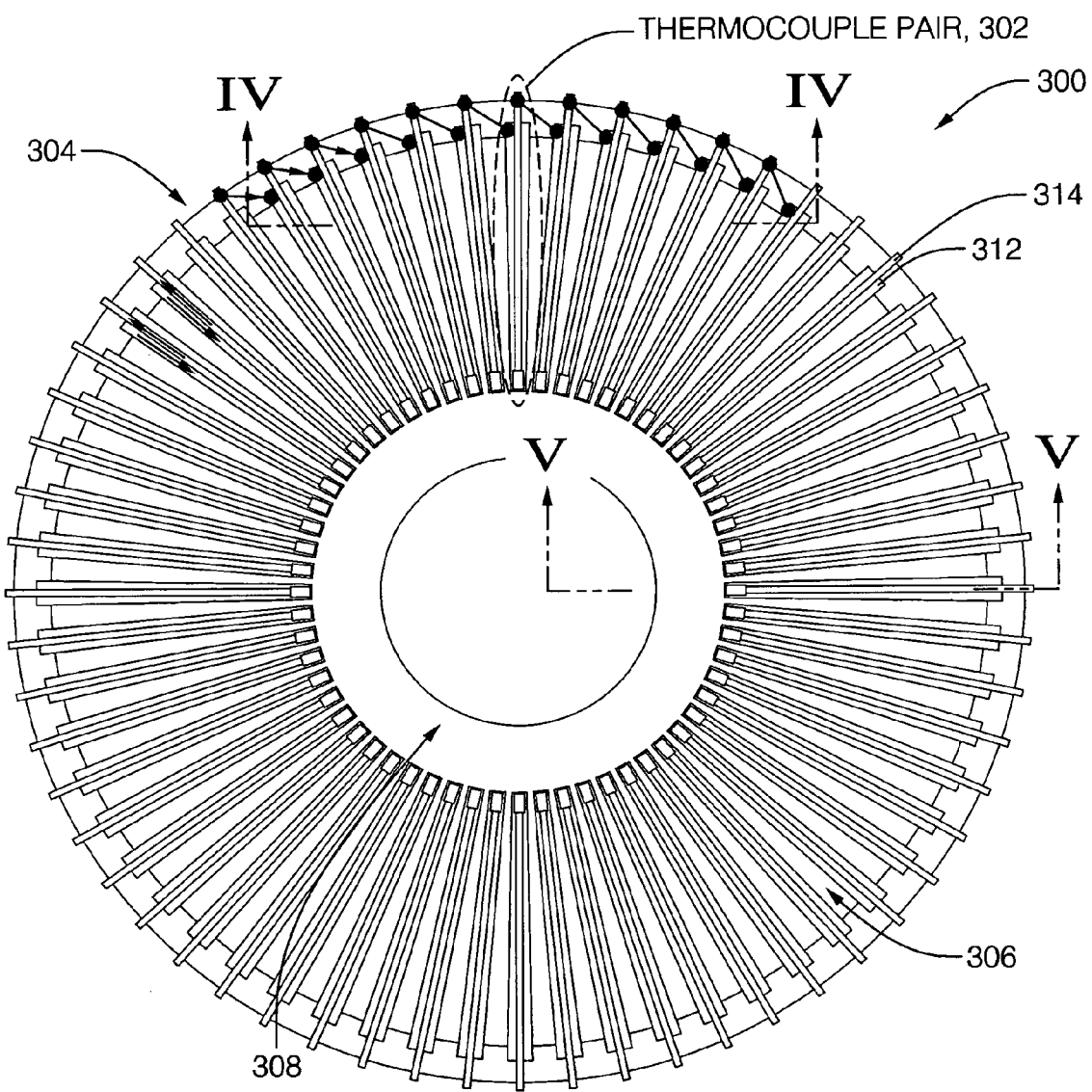
FIG. 3 is a plan view of a conventional thermocouple arrangement illustrating non-active regions of occupied space.
Figure 4A:
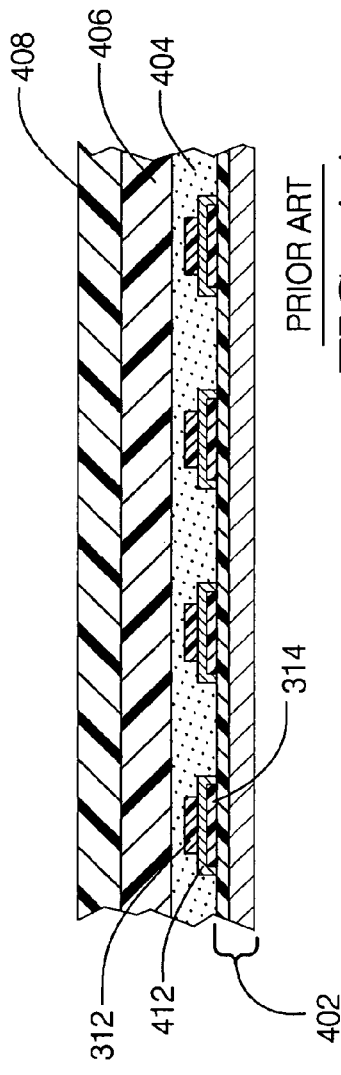
FIG. 4A is a cross-sectional side view of the thermocouple arrangement taken along the line IV in FIG. 3.
Figure 4B:
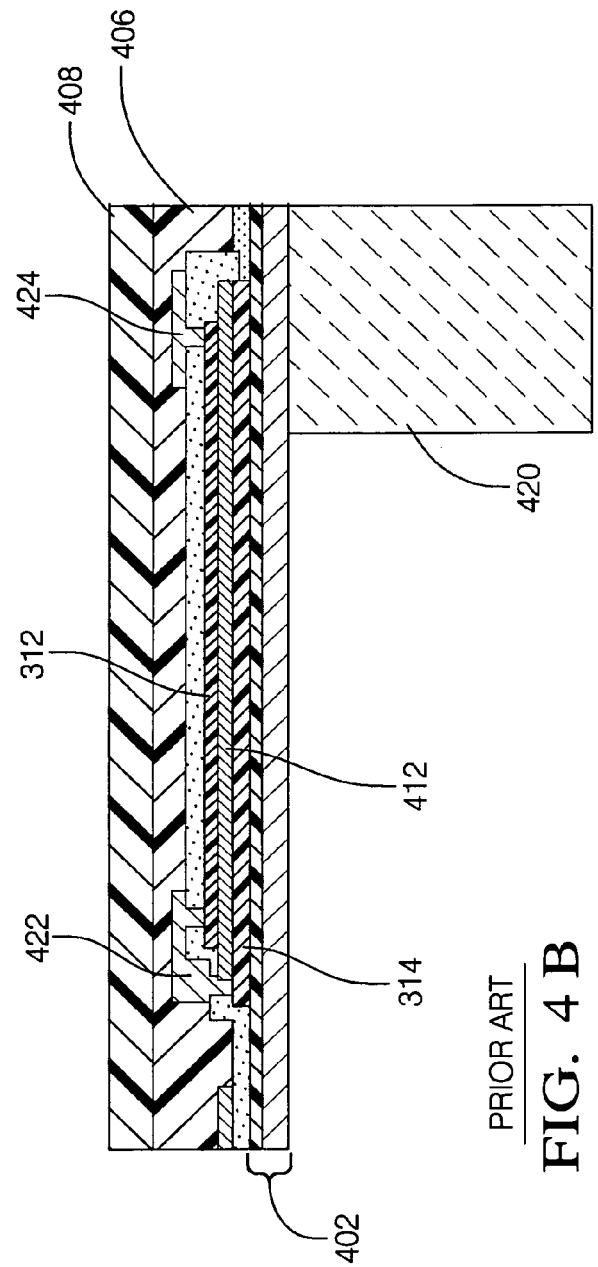
FIG. 4B is another cross-sectional side view of the thermocouple arrangement taken along the line V in FIG. 3.

Referring to the drawings wherein identical reference numerals denote the same elements throughout the various views, FIG. 3 is a plan view of a conventional thermocouple arrangement illustrating non-active regions of occupied space. The IR detecting device 300 utilizes a first material 312 and a second material 314, which are dissimilar materials. These may be, for example, n-type poly-silicon and p-type poly-silicon. The second material 312 is formed on top of, and electrically isolated from, the first material 314 (making up a thermocouple pair 302). As illustrated, the arrows 304 indicate electrical connectivity through first and second materials 312 and 314. FIG. 4A is a cross-sectional side view of the thermocouple arrangement taken along the line IV in FIG. 3. As shown, the thermocouple pair, comprising first material 312 and dissimilar second material 314 are separated by poly-oxide 412. An oxide-etch stop and LP nitride (layers 402) create a membrane for the thermocouple pair. A planarization 406 and a passivation 408 are formed over the thermocouple pair. FIG. 4B is another cross-sectional side view of the thermocouple arrangement taken along the line V in FIG. 3. This view shows the metal connectors 422 and 424, wherein metal connector 422 joins first material 312 to second material 314 at the thermally isolated region. Metal connector 424 joins first material 312 to second material 314 at the thermally sunk region situated over the silicon frame 420.

The conventional design and fabrication methods for IR detecting devices require physical or dielectric separation to achieve electrical isolation. With respect to the formation of the conventional IR detecting device 300, both the required physical separation 306 by the dielectric material and the separate process steps required for the formation of each leg of the thermocouple create a considerable non-active area 308, which consumes valuable diaphragm area, and thus reduces output signal per unit diaphragm area.

Turning again now to the present invention, a system and method are described herein for providing a thermocouple to form, for example, a thermopile upon a diaphragm for use as a thermal detector. A thermopile-based thermal detector is provided by a thermocouple having dissimilar materials with a P-N junction formed from a single sheet of material. The thermopile can be situated upon a diaphragm for receiving thermal radiation, for use as an integrated or a non-integrated thermoelectric infrared (IR) sensor and detector. Signal processing circuitry can be electrically interconnected with the thermopile.

Figure 5:
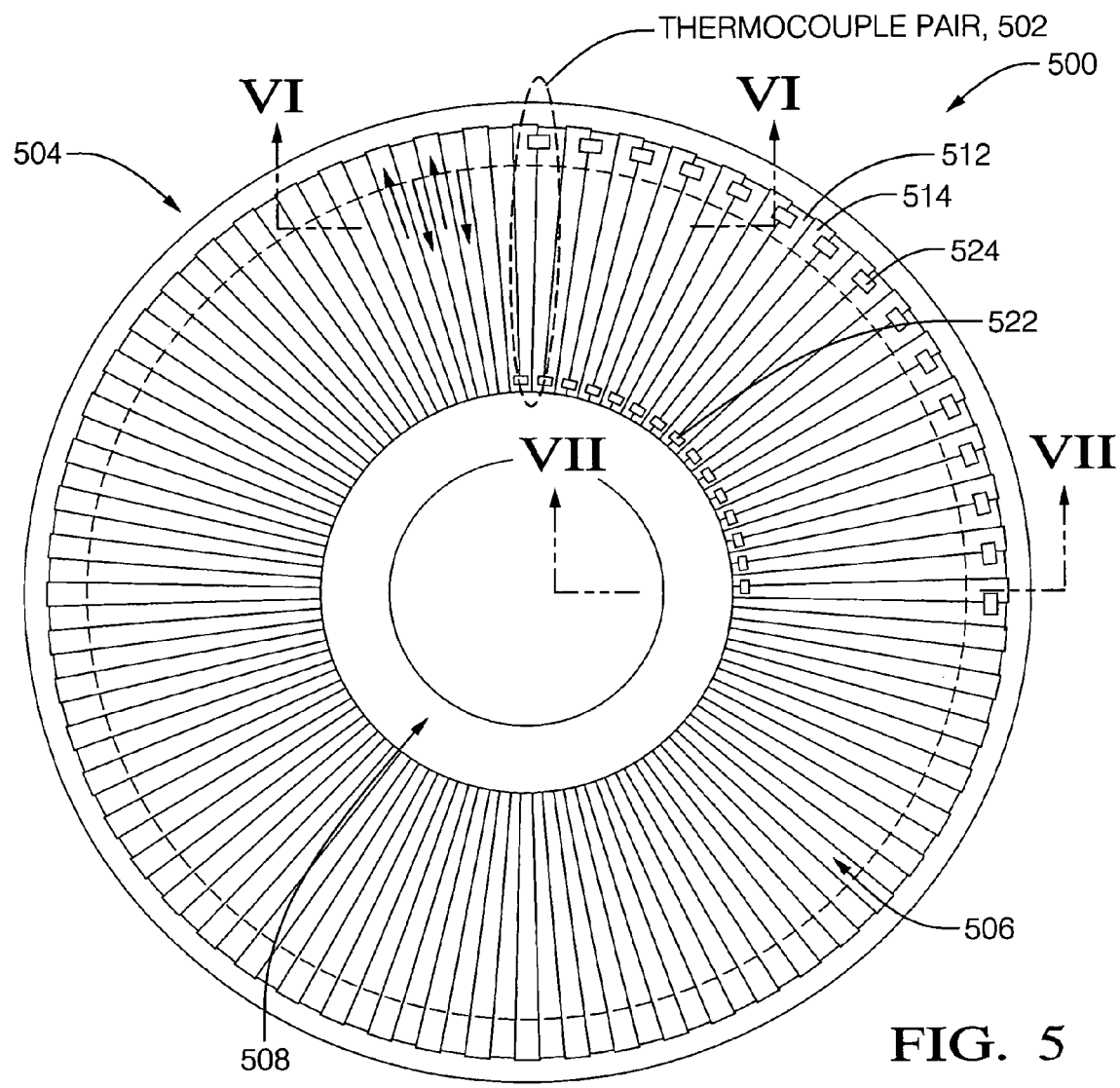
FIG. 5 is a plan view of a thermocouple arrangement having a P-N junction IR detecting device formed from a single sheet of material, in accordance with an embodiment of the present invention.

Referring to FIG. 5, a thermocouple arrangement is shown having a P-N junction IR detecting device formed from a single sheet of material, in accordance with an embodiment of the present invention. The thermal detecting device 500 utilizes a first material 512 and a second material 514, which are dissimilar materials created from a single sheet of material.

These may be, for example, n-type poly-silicon and p-type poly-silicon. The first material 512 is formed planar to, and electrically isolated from, the second material 514, making up a thermocouple material pair 502. As used herein, the term thermocouple material pair refers to the two legs of dissimilar materials (i.e., first material 512 and second material 514), which together form one thermocouple. The single sheet of material (i.e., poly-silicon) is made dissimilar by utilizing a depletion region that naturally forms during doping of the single sheet of material. The doping employed is a P-type (i.e., boron) and an N-type (i.e., phosphorous) character, in which a series of P-N junctions are formed. The formation of a depletion region allows for electrical isolation of each leg of the thermocouple (i.e. each dissimilar material) without physical separation by space and/or dielectric material. As illustrated, the arrows 504 indicate electrical connectivity through first material 512 and second material 514.

As shown in the present invention in FIG. 5, the non-active area 508 is reduced, which was unavoidable in conventional designs such as FIG. 3. Size restrictions are also reduced or eliminated for the width and length of each leg of the thermocouple. This allows an increase in the packing density of the thermocouple pairs (i.e., see packing density 506) and thus the total number of thermocouples in the thermopile for the same given area. This directly increases the signal per unit diaphragm area. This can further allow for a reduction of the thermopile overall size without loss of signal or increase of thermal noise.

Figure 6A:
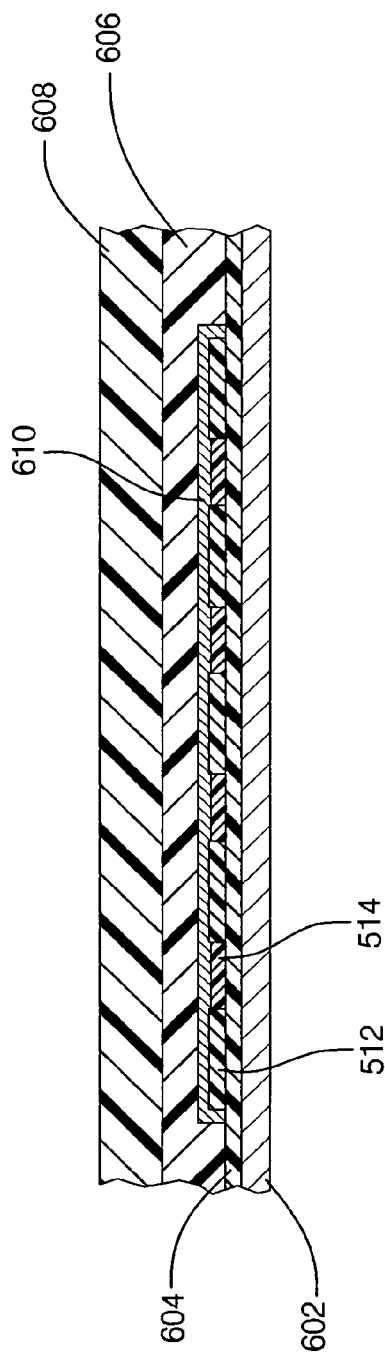
FIG. 6A is a cross-sectional side view of the thermocouple arrangement taken along the line VI in FIG. 4, in accordance with an embodiment of the present invention.

FIG. 6A is a cross-sectional side view of the thermocouple arrangement taken along the line VI in FIG. 4, in accordance with an embodiment of the present invention. The thermocouple material pair, comprising first material 512 and dissimilar second material 514, are separated by a naturally formed depletion region. An oxide-etch stop 602 and LP nitride 604 create a membrane for the thermocouple material pair. The LP nitride 604 creates a flat diaphragm since it is tensile in nature, whereas the oxide 602 is compressive in nature. The LP nitride 604 also acts as an absorbing layer. A poly-oxide 610, a planarization 606 and a passivation 608 are formed over the thermocouple material pair.

Figure 6B:
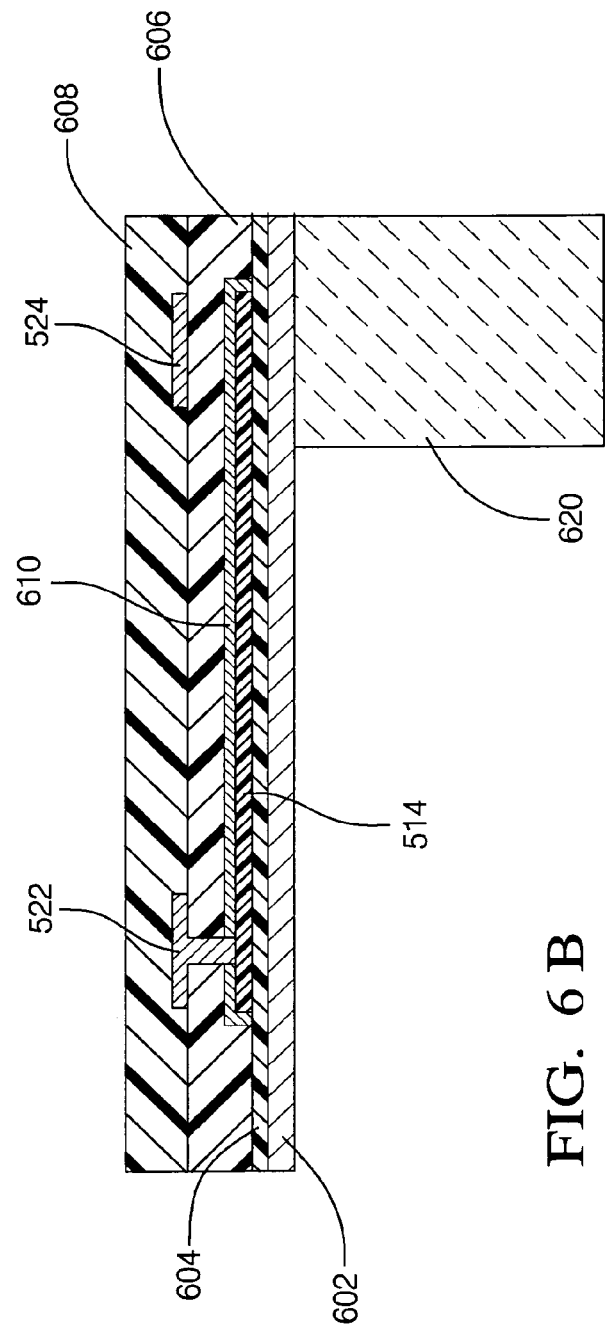
FIG. 6B is another cross-sectional side view of the thermocouple arrangement taken along the line VII in FIG. 4, in accordance with an embodiment of the present invention.

FIG. 6B is another cross-sectional side view of the thermocouple arrangement taken along the line VII in FIG. 4, in accordance with an embodiment of the present invention. This view shows the metal connectors 522 and 524, wherein metal connector 522 joins first material 512 to second material 514 at the thermally isolated region. Metal connector 524 joins first material 512 to second material 514 at the thermally sunk region situated over the silicon frame 620.

Figure 7:
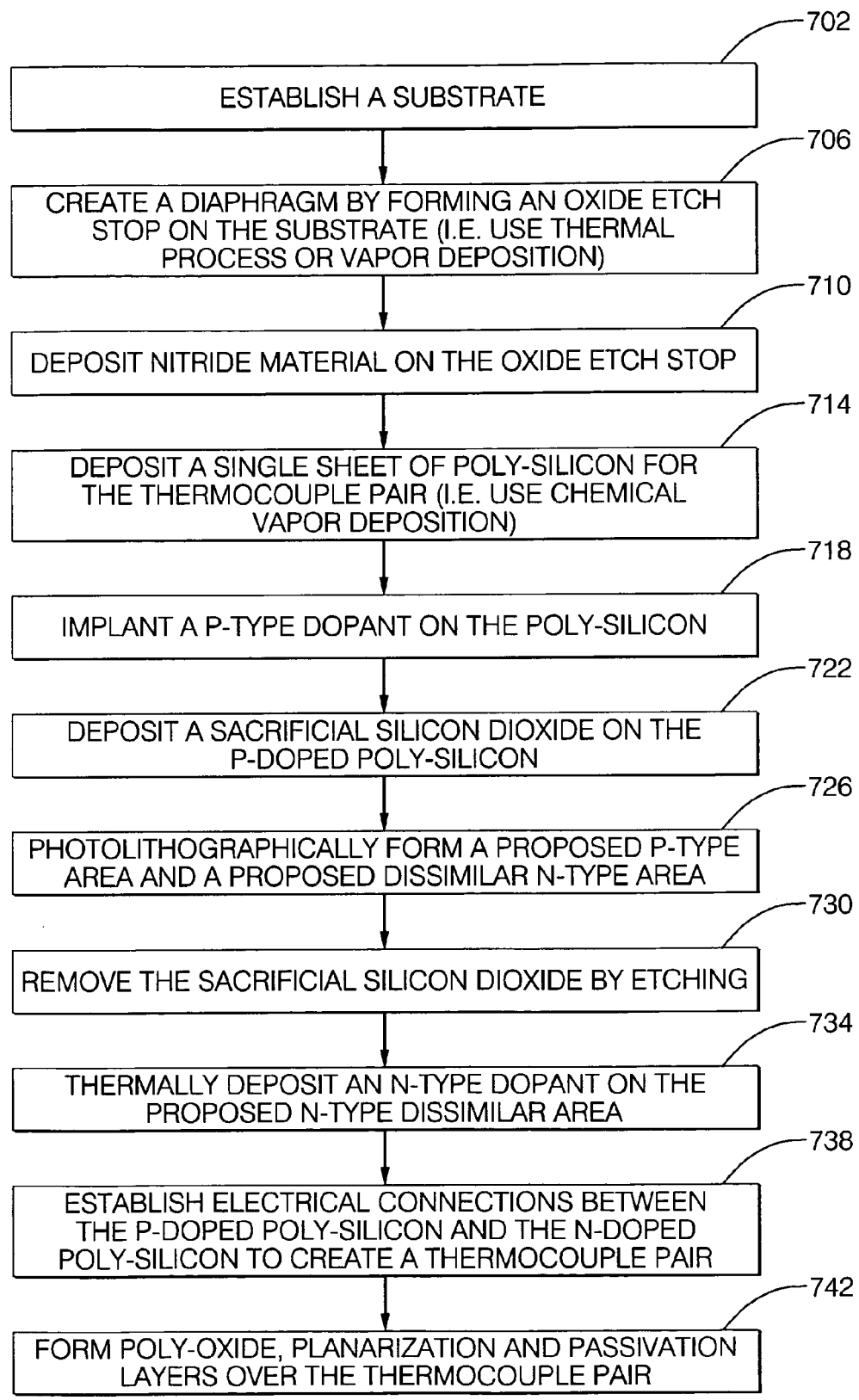
FIG. 7 illustrates example steps in fabrication of the device as in FIG. 4, in accordance with an embodiment of the present invention.

FIG. 7 illustrates example steps in fabrication of the device as in FIG. 4, in accordance with an embodiment of the present invention. It is to be appreciated that particular steps described herein may be varied depending on the intended purpose of the thermal detector, and also the method of creating a particular layer may be varied as known to those skilled in the art.

In step 702, a substrate such as silicon is established. In step 706, a diaphragm is created by forming a dielectric oxide etch stop such as silicon dioxide on the substrate by a thermal process or vapor deposition. In step 710, an LP nitride material is deposited on the oxide etch stop. Other films may next be deposited for mechanical, spectral or process integration purposes. In step 714, poly-silicon is deposited as a single sheet for the thermcouple material pair and thus the thermopile by chemical vapor deposition. In step 718, a blanket P-type dopant is implanted on the poly-silicon, such as boron or boron di-fluoride, creating one leg of the thermopile. In step 722, a sacrificial silicon dioxide is deposited on the P-doped poly-silicon. In step 726, a proposed P-type doped area and a proposed dissimilar N-type doped area are photolithographically formed. In step 730, the sacrificial silicon dioxide is removed by etching. In step 734, an N-type dopant is thermally deposited on the proposed N-type dissimilar area in sufficient quantity to counter-dope the blanket P-type dopant, forming another leg of the thermocouple. The dissimilar materials self-align. As described above, the diaphragm can be circular, rectangular, polygonal and rectangular having rounded corners, and the thermocouple is wedge-shaped and narrower at the hot junction as compared to the cold junction.

In step 738, electrical connections are established between the P-doped poly-silicon and the N-doped poly-silicon to create a thermocouple material pair. The connections may be made by direct deposition and photolithographic formation of a metal on top of the poly-silicon. Alternatively, the connection may be formed on top of a dielectric material that has been deposited onto the poly-silicon and photolithographically patterned and etched to allow appropriate connectivity. In step 742, poly-oxide, planarization and passivation layers are formed over the thermocouple material pair, as needed for the intended process.

Figure 8:
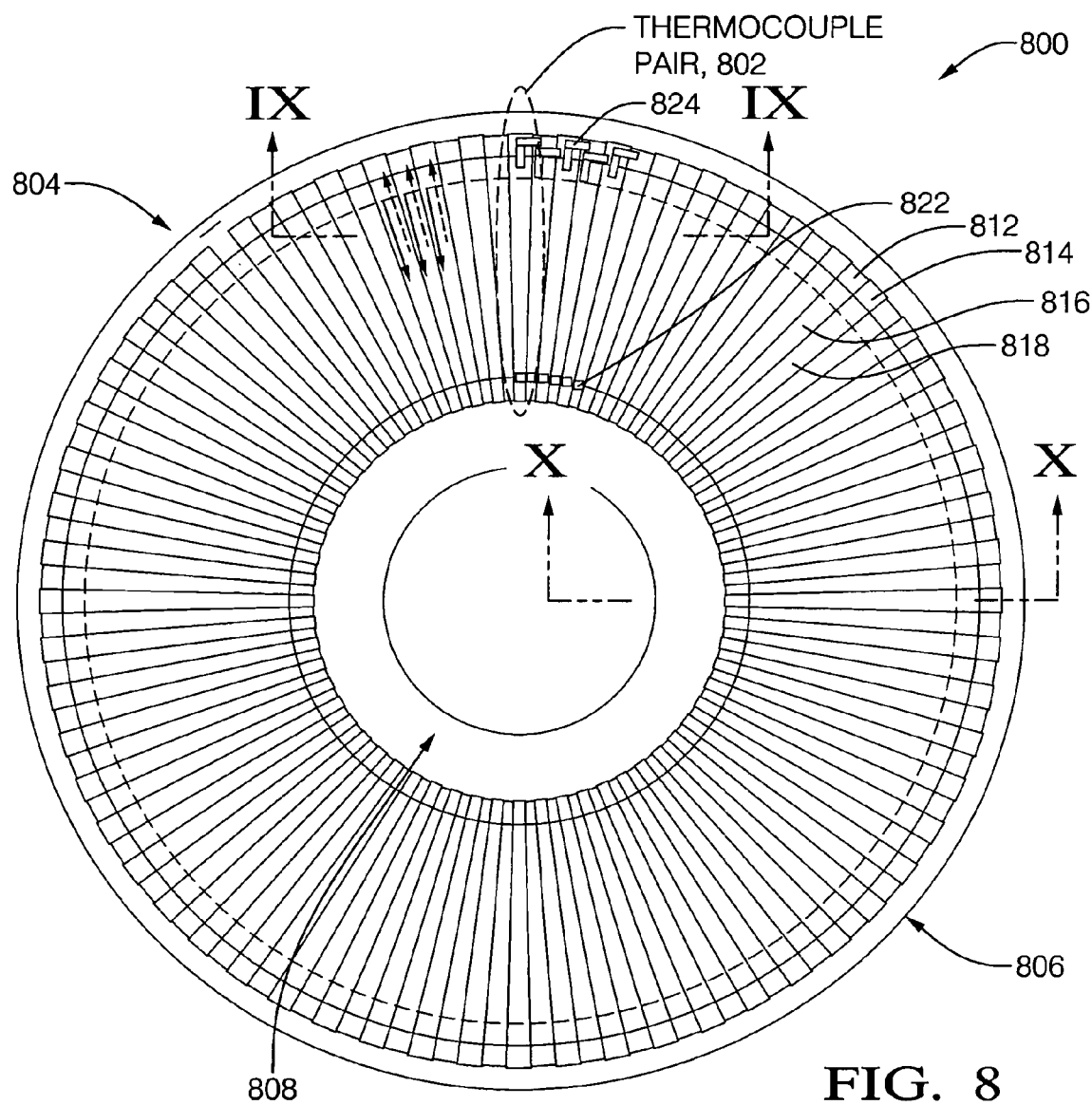
FIG. 8 is a plan view of a thermocouple arrangement having a P-N junction IR detecting device in which a plurality of single sheets of material each incorporate the P-N series junctions, in accordance with an embodiment of the present invention.

As illustrated, FIG. 8 is a plan view of a thermocouple arrangement having a P-N junction IR detecting device in which a plurality of single sheets of material each incorporate the P-N series junctions, in accordance with an embodiment of the present invention. The thermal detecting device 800 utilizes a first material 812 and a second material 814, which are dissimilar materials created from a first single sheet of material. The thermal detecting device 800 additionally utilizes a third material 816 and a forth material 818 created from a second single sheet of material. The second sheet of material is stacked on top of the first sheet of material. The second sheet of material is also electrically isolated from the first sheet of material by a dielectric material such as poly-oxide. In an example, the first material 812 and the second material 814, created from the first single sheet, are a P-type poly-silicon and an N-type poly-silicon, respectively. The third material 816 and the forth material 818, created from the second single sheet, are an N-type poly-silicon and a P-type poly-silicon, respectively.

It is to be appreciated that although two sheets of poly-silicon are shown, more than two sheets may alternatively be utilized, creating additional stacked thermopiles. This substantially increases the number of thermocouples for the same given area. Because many semiconductor processes, particularly, but not limited to, those used in monolithically integrated devices, employ two independent poly-silicon depositions for the formation of each leg of the thermopile, the plurality of stacked P-N series sheets of the present invention provides significant performance enhancements for the same or similar process complexity. As described for non-stacked P-N series sheets, the signal per unit area increase allows the device to be miniaturized and produced at a significantly reduced cost.

Like the embodiment described in FIG. 5, the single sheets of material are made dissimilar by utilizing a depletion region that naturally forms during doping of the single sheet of material. The doping employed is a P-type (i.e., boron) and an N-type (i.e., phosphorous) character, in which a series of P-N junctions are formed. The formation of a depletion region allows for electrical isolation of each leg of the thermocouple (i.e. each dissimilar material) without physical separation by space and/or dielectric material.

In an embodiment, the first material 812 which is electrically isolated from the second material 814 makes up a thermocouple material pair. As used herein, the term thermocouple material pair refers to the two legs of dissimilar materials (i.e., first material 812 and second material 814), which together form one thermocouple. In an alternative embodiment, as shown in FIG. 8, the first material 812 and the third material 816, which are electrically isolated, make up a thermocouple material pair 802. As illustrated, the arrows 804 indicate electrical connectivity through the first material 812, the second material 814, the third material 814 and the forth material 816.

It is to be appreciated that various electrical interconnect schemes may be utilized to form the overall thermopile having stacked sheets. In one embodiment, the first planar sheet of thermocouples are serially connected. When a final leg of material from the first planar sheet is reached, the first planar sheet is serially connected to the second planar sheet, and then the second planar sheet is serially connected. In an alternative embodiment, a P-doped region from the first sheet of thermocouples is serially connected to an N-doped region from the second sheet of thermocouples, then the N-doped region from the second sheet is serially connected to a P-doped region from the second sheet, and then the P-doped region from the second sheet of thermocouples is serially connected to an N-doped region from the first sheet.

As shown in the present invention in FIG. 8, the non-active area 808 is reduced, which was unavoidable in conventional designs such as FIG. 3. Size restrictions are also reduced or eliminated for the width and length of each leg of the thermocouple. This allows an increase in the packing density of the thermocouple pairs (i.e., see packing density 806) and thus the total number of thermocouples in the thermopile for the same given area. This directly increases the signal per unit diaphragm area. This can further allow for a reduction of the thermopile overall size without loss of signal or increase of thermal noise. Moreover, the signal per unit diaphragm area is further increased by stacking a plurality of sheets to form additional thermocouple pairs.

Figure 9A:
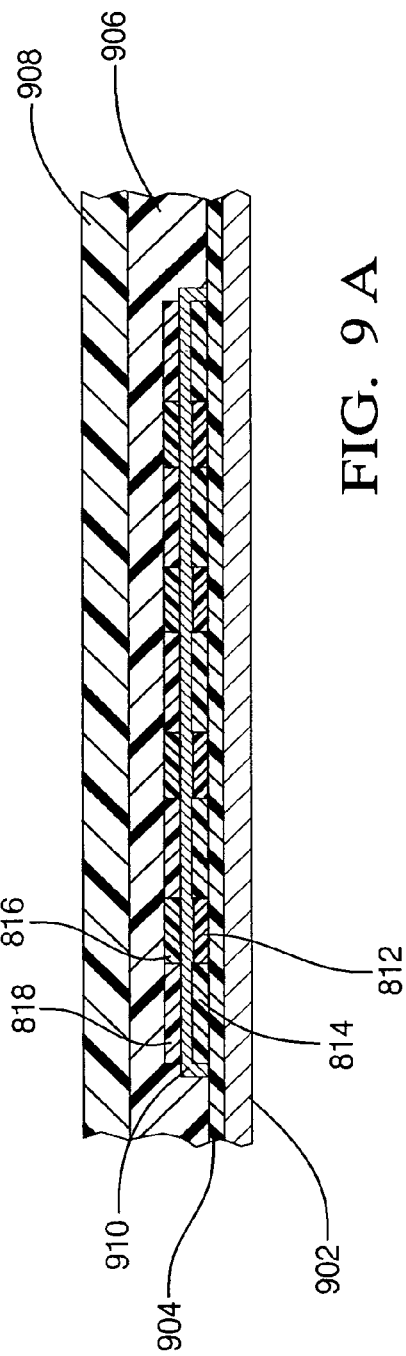
FIG. 9A is a cross-sectional side view of the thermocouple arrangement taken along the line IX in FIG. 7, in accordance with an embodiment of the present invention.

FIG. 9A is a cross-sectional side view of the thermocouple arrangement taken along the line IX in FIG. 8, in accordance with an embodiment of the present invention. As shown, the first sheet and the stacked second sheet of poly-silicon are electrically separated by poly-oxide 910. An oxide-etch stop 902 and LP nitride 904 create a membrane for the thermocouple pairs. A planarization 906 and a passivation 908 are formed over the thermocouple pairs.

Figure 9B:
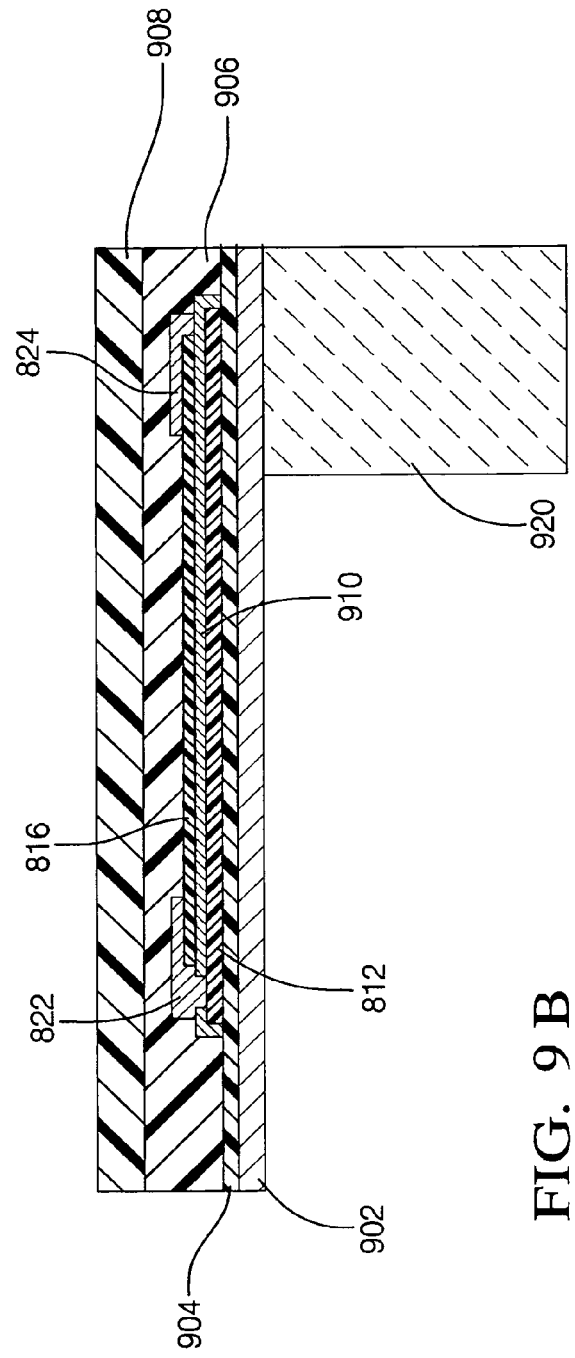
FIG. 9B is a cross-sectional side view of the thermocouple arrangement taken along the line X in FIG. 7, in accordance with an embodiment of the present invention.

FIG. 9B is a cross-sectional side view of the thermocouple arrangement taken along the line X in FIG. 8, in accordance with an embodiment of the present invention. This view shows the metal connectors 822 and 824, wherein metal connector 822 joins first material 812 to third material 816 at the thermally isolated region. Metal connector 824 joins third material 816 to second material 814 at the thermally sunk region situated over the silicon frame 920.

A further understanding of the above description can be obtained by reference to the following experimental result examples that are provided for illustrative purposes and are not intended to be limiting.

Referring to FIG. 10, example signal performances are illustrated of the present invention as in FIG. 5 and FIG. 8 as compared with conventionally IR sensors. The efficiency of IR detectors can be compared by performance attributes such as signal per unit diaphragm area and signal to noise per unit diaphragm area. As shown by experimental results, the signal and the signal to noise ratio increases beyond the typical contemporary designs when employing a single sheet planar embodiment as in FIG. 5, and increases even more with a dual sheet (stacked) planar embodiment as in FIG. 8. A 215% signal increase was experimentally observed using the single sheet planar embodiment with P+ poly and N+ poly, as compared to a conventional configuration. A 615% signal increase was experimentally observed using the dual sheet planar embodiment with P+ poly and N+ poly for one sheet and P+ poly and N+ poly for the stacked sheet, as compared to a conventional configuration.

FIG. 11 illustrates example required diaphragm area of the present invention as in FIG. 5 and FIG. 8 as compared with conventionally IR sensors. As observed by experimental results, a signal of 46 µV/C is generated by the contemporary design and the present invention, although the necessary diaphragm area is reduced in the present invention embodiments. The single sheet planar embodiment as in FIG. 5 generates a signal of 46 µV/C with a diaphragm area reduced by 19%, as compared to the typical contemporary design. The dual sheet (stacked) planar embodiment as in FIG. 8 generates a signal of 46 µV/C with a diaphragm area reduced by 63%, as compared to the typical contemporary design.

Other features and advantages of this invention will be apparent to a person of skill in the art who studies this disclosure. Thus, exemplary embodiments, modifications and variations may be made to the disclosed embodiments while remaining within the spirit and scope of the invention as defined by the appended claims.

We claim:

1. A thermal detector comprising:
   a substrate defining a cavity:
   a diaphragm having a first portion positioned over the cavity for receiving thermal energy, and a second portion at a perimeter of the diaphragm supported by the substrate; and
   at least one thermocouple material pair, formed from a single sheet of material, comprising dissimilar electrically conductive materials, wherein the dissimilar materials include a P-doped and N-doped junction electrically isolated via a depletion region, and the at least one thermocouple material pair is created by depositing poly-silicon by chemical vapor deposition, implanting a P-type dopant, depositing a sacrificial silicon dioxide on the P-type doped polysilicon, photolithographically forming a proposed P-type dissimilar area and a proposed N-type dissimilar area, removing the sacrificial silicon dioxide by etching, and thermally depositing an N-type dopant on the proposed N-type dissimilar area,
   wherein the at least one thermocouple material pair extends from the diaphragm to the substrate, defining a hot junction located on the first portion of the diaphragm and a cold junction located on the second portion of the diaphragm, and wherein the at least one thermocouple material pair is electrically connected forming at least one thermocouple.

2. The thermal detector as in claim 1, further comprising a second layer of at least one thermocouple axially positioned over a first layer of the at least one thermocouple, an electrically insulating material positioned in between the first thermocouple layer and the second thermocouple layer, whereby the at least one thermocouple in the first thermocouple layer is electrically insulated from the at least one thermocouple in the second thermocouple layer, and electrically connecting a leg in an at least one thermocouple from the first thermocouple layer to a leg in an at least one thermocouple in the second thermocouple layer forming a cold junction between dissimilar materials on the first and second thermocouple layers.

3. The thermal detector as in claim 2, wherein the at least one thermocouple on the first thermocouple layer is serially electrically connected, then the first thermocouple layer is serially electrically connected to the second thermocouple layer, and then the at least one thermocouple on the second thermocouple layer is serially electrically connected.

4. The thermal detector as in claim 2, wherein a P-doped region from the first thermocouple layer is serially connected to an N-doped region from the second thermocouple layer, then the N-doped region from the second thermocouple layer is serially connected to a P-doped region from the second thermocouple layer, and then the P-doped region from the second thermocouple layer is serially connected to an N-doped region from the first thermocouple layer.

5. The thermal detector as in claim 1, wherein the diaphragm further comprises an oxide situated adjacent to a nitride material.

6. The thermal detector as in claim 1, wherein the single sheet of material comprises poly-silicon.

7. The thermal detector as in claim 1, further comprising a passivation layer overlying the at least one thermocouple material pair.

8. The thermal detector as in claim 1, wherein the at least one thermocouple material pair is situated adjacent a bordering thermocouple material pair without an intermediate space therebetween.

9. The thermal detector as in claim 1, further comprising signal processing circuitry electrically interconnected with the at least one thermocouple.

10. The thermal detector as in claim 1, wherein the at least one thermocouple is electrically interconnected with a further thermocouple, forming a thermopile.

11. The thermal detector as in claim 1, wherein the diaphragm is shaped in a form being one of circular, rectangular, polygonal, and rectangular having rounded corners, and wherein the at least one thermocouple material pair is wedge-shaped and narrower at the hot junction as compared to the cold junction.

12. The thermal detector as in claim 1, wherein the at least one thermocouple is formed by electrical connection at the hot junction, and the at least one thermocouple being in serial electrical connection to a bordering at least one thermocouple at the cold junction, and the bordering at least one thermocouple being disposed adjacent the at least one thermocouple on the single sheet of material.

13. A method for establishing a thermal detector comprising:
creating a substrate defining a cavity;
creating a diaphragm having a first portion positioned over the cavity for receiving thermal energy, and a second portion at a perimeter of the diaphragm supported by the substrate;
creating at least one thermocouple material pair from a single sheet of material, comprising dissimilar electrically conductive materials, wherein the dissimilar materials include a P-doped and N-doped junction electrically isolated via a depletion region, and
creating the at least one thermocouple material pair by depositing poly-silicon by chemical vapor deposition, implanting a P-type dopant, depositing a sacrificial silicon dioxide on the P-type doped polysilicon, photolithographically forming a proposed P-type dissimilar area and a proposed N-type dissimilar area, removing the sacrificial silicon dioxide by etching, and thermally depositing an N-type dopant on the proposed N-type dissimilar area,
wherein the at least one thermocouple material pair extends from the diaphragm to the substrate, defining a hot junction located on the first portion of the diaphragm and a cold junction located on the second portion of the diaphragm, and wherein the at least one thermocouple material pair is electrically connected forming at least one thermocouple.

14. The method as in claim 13, further comprising axially positioning a second layer of at least one thermocouple over a first layer of the at least one thermocouple, positioning an electrically insulating material in between the first thermocouple layer and the second thermocouple layer, whereby the at least one thermocouple in the first thermocouple layer is electrically insulated from the at least one thermocouple in the second thermocouple layer, and electrically connecting a leg of an at least one thermocouple from the first thermocouple layer to a leg in an at least one thermocouple in the second thermocouple layer forming at cold junction between dissimilar materials on the first and second layers.

15. The method as in claim 14, further comprising serially electrically connecting the first thermocouple layer to the second thermocouple layer, wherein the at least one thermocouple on the first thermocouple layer is serially electrically connected, then the first thermocouple layer is serially electrically connected to the second thermocouple layer, and then the at least one thermocouple on the second thermocouple layer is serially electrically connected.

16. The method as in claim 14, further comprising serially connecting the first thermocouple layer to the second thermocouple layer, wherein a P-doped region from the first thermocouple layer is serially connected to an N-doped region from the second thermocouple layer, then the N-doped region from the second thermocouple layer is serially connected to a P-doped region from the second thermocouple layer, and then the P-doped region from the second thermocouple layer is serially connected to an N-doped region from the first thermocouple layer.

17. The method as in claim 13, further comprising creating the diaphragm by forming an oxide etch stop on the substrate by one of thermal process and vapor deposition, and depositing a nitride material adjacent to the oxide etch stop.

18. The method as in claim 13, further comprising creating a passivation layer overlying the thermocouple material pair.

19. The method as in claim 13, further comprising situating the at least one thermocouple material pair adjacent to a bordering thermocouple material pair without an intermediate space therebetween.

20. The method as in claim 13, further comprising electrically interconnecting signal processing circuitry with the at least one thermocouple.

21. The method as in claim 13, wherein the at least on thermocouple is electrically interconnected with a further thermocouple, forming a thermopile.

22. The method as in claim 13, further comprising shaping the diaphragm in a form being one of circular, rectangular, polygonal and rectangular having rounded corners, and forming the at least one thermocouple material pair in a wedge shape, said wedge shape being narrower at the hot junction as compared to the cold junction.

23. The method as in claim 13, further including the step of serially electrically connecting the at least one thermocouple to a bordering at least one thermocouple at the cold junction, and the at least one thermocouple being formed by electrical connection at the hot junction, and the bordering at least one thermocouple being disposed adjacent the at least one thermocouple on the single sheet of material.

* * * * *